UNITED STATES PATENT OFFICE.

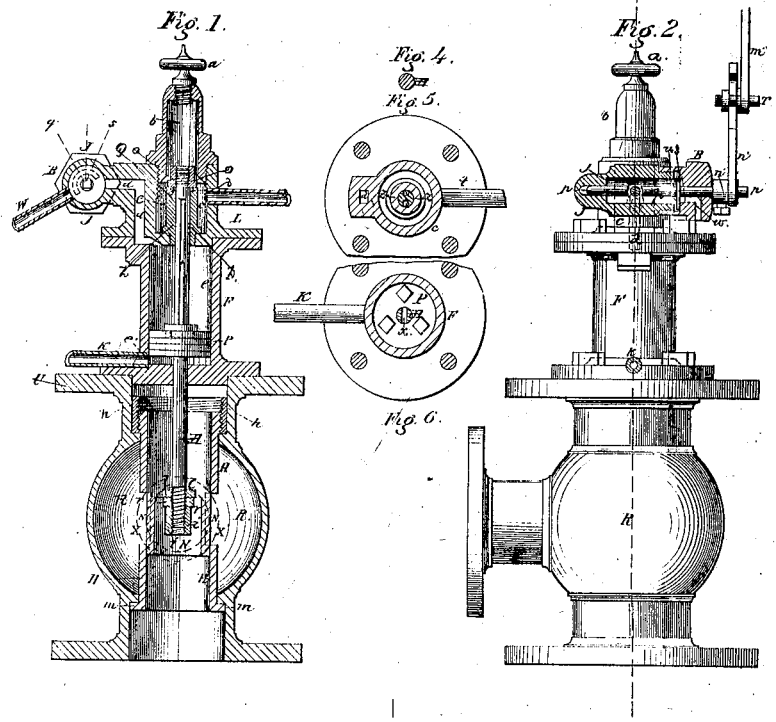
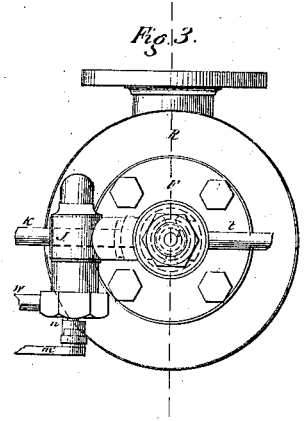

JOSEPH REICHMANN AND HEINRICH KRIETE, OF CHICAGO, ILLINOIS.

IMPROVED GOVERNOR-VALVE.

Specification forming part of Letters No. 34,523, dated February 25, 1862.

*To all whom it may concern:*

Be it known that we, JOSEPH REICHMANN and HEINRICH KRIETE, of Chicago, in the county of Cook, in the State of Illinois, have invented a new and Improved Mode of Constructing Steam-Governors; and we do hereby declare that the following is a full and exact description thereof, reference being had to the accompanying drawings, and to the letters of reference marked thereon.

The nature of our invention consists, first, of an arrangement permitting steam from the boiler and steam from the cylinder of the engine to act against each other upon a piston or its equivalent. Any effect or difference arising between the said pressures will cause the regulation of the quantity of steam to be admitted to the cylinder of the engine to operate her with equal speed. Second, of an arrangement counterbalancing the piston or its equivalent upon which the boiler-steam and that of the cylinder of the engine act against each other.

To enable others skilled in the art to make and use our invention, we will proceed to describe its construction and operation.

Figure 1 is a vertical section of the steam-governor. Fig. 2 represents a side elevation of the steam-governor and a section through cylinder J. Fig. 3 is a plan of the steam-governor. Fig. 4 represents a horizontal section of the rod I, at Q. (See Fig. 1.) Fig. 5 is a horizontal section of the cylinder c and of the rod I at L. (See Fig. 1.) Fig. 6 is a horizontal section of the cylinder F and of the rod I at A. (See Fig. 1.)

We construct our governor of the following parts: first, of cylinder H, with the steam-ports x x, which is fastened into the globe-chamber R R by means of screw h h and lap m m; second, of cylinder F, which is fastened above and in line with cylinder H, by means of four bolts, to the flanges U of the globe-case R R; third, of piston P, (fitting cylinder F steam-tight, but allowing the same to fall by its own weight,) dividing cylinder F into two independent chambers, e and e'; fourth, of the pipe K, forming a connection between the cylinder of the engine and the cylinder F, for the purpose of carrying the steam of the cylinder of the engine into cylinder F, space e', and under piston, P; fifth, of cylinder c c, placed on the top of cylinder F and in line with it. It is fastened, by means of four bolts, to the top flange of cylinder F; sixth, of a piece-pipe, z z, which is screwed into the center of the bottom of the cylinder c c, fitting rod I steam-tight. The lower part of rod I, extending into the cylinder H, has the object to communicate any change in the position of the piston P directly to the governor-valve N, (N fitting cylinder H steam-tight.) The upper part of rod I, extending through cylinder F into cylinder c, has the object to cut off or to admit the proper quantity of boiler-steam by means of the tapering steam-grooves x x, cut into the rod I, to act upon piston P, chamber e. Pipe t, forming a connection between the boiler and cylinder c, carries the boiler-steam into cylinder c; seventh, of nut o o, fastened to the top end of rod I, preventing the same from dropping beyond the position shown in Fig. 1. As rod I is also in connection with governor-valve N, said shown position of rod I is such when the engine is not operated and the position of the governor-valve is such as to give steam-port (see Fig. 1) to start the engine with it, and also to lift piston P as much as to throw valve N into such position as to allow the steam to pass under it, instead of over it, as it is in the moment only when the steam of the boiler is given to the engine J of the cylinder b, which forms the cover of the cylinder c, and allows the rod I to play freely in it. A small screw, a, seen at the top of cylinder b, allows the oiling of rod I with its connections.

The arrangement for the counterbalancing of piston P with its connection consists of the parts as follows: first, of cylinder J, in connection with cylinder F by means of the steam-passage d d; second, of cylinder-head B, containing a half-circular tapering steam-groove, y y, which is in connection with a pipe, W; third, of a circular plate-valve, M, with the opening U. Valve M is held or guided by the valve-stem p p, which turns at one end in the cylinder-head B, at the other in a guide opposite to the cylinder-head B; fourth, of the lever-arm n' and connecting-rod m', the object of which is to communicate motion to valve-stem p p, and consequently the valve M. This arrangement described produces the balancing or counterbalancing of the piston P and connections by exhausting a certain portion of boiler-steam acting upon piston P in chamber e.

The operation of our governor is the following: Boiler-steam is given to cylinder c by means of pipe t, the throttle-valve being opened, and boiler-steam is rushing into the globe-chamber R R, in consequence of the position of rod I, held by means of nut o o, the latter resting upon pipe z z. The boiler-steam will pass over and through the governor-valve N, (N being hollow,) toward and into the cylinder of the engine. (See arrows, Fig. 1.) As pipe K is opened by means of a little valve which is operated by the valve-motion of the engine when the cylinder of the engine takes steam, and closed at the moment said steam exhausts, and forming a connection between the cylinder of engine and the chamber e' in cylinder F of our steam-governor, the steam from the cylinder of the engine will also rush into chamber e', cylinder F, and will act under and against piston P. Said steam, of course, forces P up. In going up, piston P moves the same time the governor-valve N, which is in direct connection with the lower part of rod I, and then steam will pass under the governor-valve N to the cylinder of the engine, instead of over and through it, as it does in the moment the engine gets steam. The upper part of rod I, with nut o o, moves also at the same time upward. It is also in connection with piston P, which causes, on account of the tapering grooves x x, cut into the rod I, and with reference to the direction of the taper of the grooves x x, being deepest near piston P, and running out to nothing near nut o o, an increase of steam-opening through which the boiler-steam out of cylinder C will pass into chamber e in cylinder F to act upon piston P—that is, against the steam of the cylinder of the engine, which acts under piston P. This of course will stop the piston P from going any higher. It will, in the contrary, overcome all the resistance given by the steam of the cylinder of engine acting under the piston P. It will, in fact, balance the piston P, which we accomplish in a most perfect degree by our exhaust arrangement, the operation of which we hereby describe. We turn the opening U (cut through the circular plate-valve M, forming one passage with the half-circular tapering groove y y, the latter being in connection with the exhaust-pipe w, and deepest at the point where w connects with y y) in the direction from s to f q, (see Fig. 1,) in consequence of which we gain a gradual increase of opening, until we find that the engine runs at its usual speed, which proves of course that piston P has reached a position which dictates the proper point of cut-off to the governor-valve N, or, what is the same, that said valve cuts off the proper quantity of steam to run the engine with the usual and an equal speed.

The connection we make between our connecting-rod m' and the speed-indicator of the engine, (no matter of what shape or principle,) has the object to work the engine perfect, also, in case an imperfection may take place either in the engine or our governor by some reason.

What we claim as our invention, and desire to secure by Letters Patent, is—

1. The use of the steam of the boiler and that of the engine, acting against each other to operate the governor-valve or its equivalent of a steam-engine.

2. The peculiar construction and combination of the whole governor, as described.

JOSEPH REICHMANN.
HEINRICH KRIETE.

Witnesses:
C. W. THEO. KRAUSCH,
WILHELM NIEMANN.